United States Patent Office 3,340,271
Patented Sept. 5, 1967

3,340,271
TRICYCLIC ETHERS
Lincoln Harvey Werner, Summit, N.J., assignor to Ciba Corporation, New York, N.Y., a corporation of Delaware
No Drawing. Filed June 11, 1964, Ser. No. 374,262
7 Claims. (Cl. 260—309.6)

The present invention concerns 2-(An-O-methyl)-1,3-diaza-2-cycloalkenes, in which An is a 9-anthryl radical, and in which the 1,3-diaza-2-cycloalken-2-yl portion has from five to seven ring members, or salts thereof, as well as process for the preparation of such compounds.

More especially, it relates to compounds of the following formula

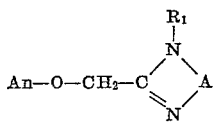

in which An is a 9-anthryl radical, the group $R_1$ is hydrogen or an aliphatic group, and A is lower alkylene separating the two nitrogen atoms by two to four carbon atoms, and the salts thereof.

Apart from the 1,3-diaza-2-cycloalken-2-yl-methoxy group, the 9-anthryl portion is unsubstituted or substituted by one or more than one of the same or of different substituents attached to any of the positions available for substitution. Such substituents are, for example, aliphatic substituents, such as lower alkyl, e.g. methyl, ethyl, n-propyl, isopropyl, n-butyl, isobutyl, secondary butyl, tertiary butyl and the like, etherified hydroxyl, particularly lower alkoxy, e.g. methoxy, ethoxy, n-propyloxy, isopropyloxy and the like, as well as lower alkenyloxy, e.g. allyloxy and the like, lower alkylenedioxy, e.g. methylenedioxy, 1,1-ethylenedioxy and the like, or any other etherified hydroxyl group, or esterified hydroxyl, such as halogeno (representing hydroxyl esterified by a hydrohalic acid), e.g. fluoro, chloro, bromo and the like, as well as etherified mercapto, such as lower alkylmercapto, e.g. methylmercapto, ethylmercapto, n-propylmercapto, isopropylmercapto and the like, acyl, such as lower alkanoyl, e.g. acetyl, propionyl, n-butyryl, pivaloyl and the like, halogen-lower alkyl, e.g. trifluoromethyl, 1,1,2,2,2-pentafluoroethyl and the like, or any other suitable substituent.

The 1,3-diaza-2-cycloalken-2-yl portion having from five to seven ring members, which is represented in the above structural formula by the group of the following partial formula

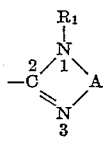

is more particularly a 2-imidazolin-2-yl radical, but may also be a 1,4,5,6-tetrahydro-2-pyrimidyl radical or a 1,3-diaza-2-cyclohepten-2-yl radical. The carbon atoms of the 1,3-diaza-2-cycloalken-2-yl radical available for substitution may be unsubstituted or may be substituted, especially by lower alkyl, e.g. methyl, ethyl, n-propyl, isopropyl, n-butyl, tertiary butyl and the like, or any other suitable substituent. One of the aza-nitrogen carries a hydrogen atom, which, if desired, may be replaced by an aliphatic radical, such as a lower aliphatic group, particularly lower alkyl, e.g. methyl, ethyl, n-propyl, isopropyl, n-butyl, secondary butyl, tertiary butyl and the like, as well as a substituted aliphatic radical, such as phenyl-lower alkyl, e.g. benzyl and the like.

Thus, in the previous formula, the group A stands for lower alkylene separating the two nitrogens by two to four carbon atoms, which may be unsubstituted or substituted, especially by lower alkyl; A is above all represented by 1,2-ethylene, but may also be 1,3-propylene or 1,4-butylene, as well as 1-methyl-1,2-ethylene, 2-methyl-1,2-ethylene, 1,1-dimethyl - 1,2-ethylene, 1,2-dimethyl-1,2-ethylene, 1-ethyl-1,2-ethylene, 1-isopropyl-1,2-ethylene, 1-methyl-1,3-propylene, 2-methyl-1,3-propylene, 1,2-dimethyl-1,3-propylene, 2,2-dimethyl - 1,3-propylene, 1,3-dimethyl-1,3-propylene, 1-ethyl-1,3-propylene, 2-isopropyl-1,3 - propylene, 1-methyl-1,4 - butylene, 1,2-dimethyl-1,4-butylene, 1-n-propyl-1,4-butylene and the like, whereas the group $R_1$ is hydrogen, as well as an aliphatic group, such as a lower aliphatic substituent, especially lower alkyl.

Salts of the compounds of this invention are acid addition salts, such as the pharmaceutically acceptable, nontoxic acid addition salts with inorganic acids, e.g. hydrochloric, hydrobromic, sulfuric, phosphoric acids and the like, or with organic acids, such as organic carboxylic acids, e.g. formic, acetic, propionic, glycolic, malonic, succinic, maleic, hydroxymaleic, fumaric, malic, tartaric, citric, glucuronic, benzoic, cinnamic, salicylic, 4-amino-salicylic, 2-phenoxybenzoic, 2-acetoxybenzoic, pamoic, nicotinic, isonicotinic acid and the like, or organic sulfonic acids, e.g. methane sulfonic, ethane sulfonic, 2-hydroxyethane sulfonic, ethane 1,2-disulfonic, benzene sulfonic, p-toluene sulfonic, naphthalene 2-sulfonic acid and the like. Other acid addition salts are useful as intermediates, for example, in the purification of the free compounds or in the preparation of other, for example, pharmaceutically acceptable acid addition salts, or for identification and characterization purposes. Acid addition salts which are primarily used for the latter are, for example, those with certain inorganic acids, e.g. perchloric acid and the like, with acidic organic nitro compounds, e.g. picric, picrolonic, flavianic acid and the like, or with metal complex acids, e.g. phosphotungstic, phosphomolybdic, chloroplatinic, Reinecke acid and the like.

The new compounds of this invention have hypertensive properties and are, therefore, useful in the treatment of hypotension, for example, in connection with shock conditions, e.g. traumatic shock, shock due to injuries, postsurgical shock, hemorrhagic shock and the like. It has been found that the compounds of this invention are practically free from side effects, such as marked secondary hypotension, the tendency to cause cardiac failures and the like.

Outstanding pharmacological properties are exhibited by compounds of the following formula

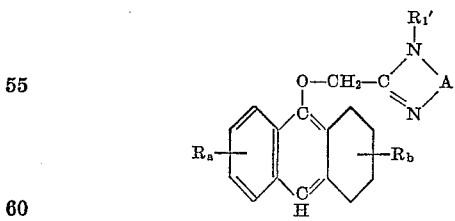

in which each of the groups $R_a$ and $R_b$ is above all hydrogen, as well as lower alkyl, lower alkoxy, halogeno or trifluoromethyl, A' stands for alkylene having from two to three carbon atoms and separating the two nitrogen atoms by two to three carbon atoms, and $R'_1$ is primarily hydrogen, as well as lower alkyl, and acid addition salts, particularly pharmaceutically acceptable, nontoxic acid addition salts, thereof.

The compounds of this invention are useful in the form of compositions for enteral, e.g., oral, or parenteral use comprising essentially a pharmacologically effective amount of one of the compounds of this invention as the pharmacologically active ingredient together with a pharmaceutically acceptable organic or inorganic, solid or liquid carrier; usually the latter represents the major portion of a pharmaceutical composition. For making up the latter, there are employed known carried substances, such as water, sugars, e.g., lactose, sucrose, glucose and the like, starches, e.g., corn starch, wheat starch, rice starch and the like stearic acid, or salts thereof, e.g., magnesium stearate, calcium stearate and the like, talc, vegetable oils, benzyl alcohol, stearyl alcohol, gelatine, gums, accacia, tragacanth, propylene glycol, polyalkylene glycols or any other carrier materials suitable for making up such compositions. The latter may be in solid form, for example, as capsules, tablets, dragées and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They are prepared according to the procedures known in the art, and, if desired, may also contain, in combination, other pharmacologically useful substances.

The compounds of the present invention are prepared according to known methods, for example, by treating a metal salt of an anthrone compound with a reactive esterified 1,3-diaza-2-cycloalken-2-yl-methanol, in which the 1,3-diaza-2-cycloalken-2-yl portion has from five to seven ring members, or a salt thereof, and, if desired, converting a resulting salt into the free compound or into another salt, and/or, if desired, replacing in a resulting compound a hydrogen attached to one of the aza-nitrogens of the 1,3-diaza-2-cycloalken-2-yl portion by an aliphatic group, and/or, if desired, converting a free compound into a salt thereof.

Metal salts of the starting materail having the following formula An–O$^\ominus$M$^\oplus$, in which An has the previously-given meaning, and M$^\oplus$ is the ion of a metal, are particularly alkali metal, e.g., lithium, sodium or potassium, salts, as well as alkaline earth metal salts thereof. These salts are formed according to known methods for example, by reacting the free starting material with a suitable metal, particularly alkali metal, or, more especially, a metal reagent, such as an alkali metal hydride or amide, e.g., lithium, sodium or potassium hydride or amide and the like, or an alkali metal lower alkoxide, e.g., sodium or potassium methoxide, ethoxide, tertiary butoxide and the like, in the presence of an appropriate diluent. These salts of the starting material are preferably used with the free reactive ester of the 1,3-diaza-2-cycloalken-2-yl-methanol.

A reactive esterified 1,3-diaza-2-cycloalken-2-yl-methanol used as the reagent in the above reaction is, for example, the ester of such methanol compound with a strong inorganic acid, such as a mineral acid, for example, a hydrohalic acid, e.g., hydrochloric, hydrobromic, hydriodic acid, or sulfuric acid, or with a strong organic acid, particularly a strong organic sulfonic acid, such as a lower alkane sulfonic acid or a monocyclic carbocyclic aryl sulfonic acid, e.g., methane sulfonic, ethane sulfonic, 2-hydroxy-ethane sulfonic, p-toluene sulfonic acid and the like. Preferred reactive esterified 1,3-diaza-2-cycloalken-2-yl-methanol reagents are the 1,3-diaza-2-cycloalken-2-yl-methyl halides, e.g., chloride, bromide and the like. Salts of the reactive esters of 1,3-diaza-2-cycloalken-2-yl-methanols are addition salts with acids, such as those mentioned before, particularly those with hydrohalic acids. These acid addition salts are preferably used with the salt of the starting material in the presence of an excess amount of the salt forming reagent to liberate the free reagent from its acid addition salt.

The reaction is carried out in the presence of a diluent, the selection of which depends on the properties of the starting material and the reagent; thus, a salt of the starting material is reacted with the reactive esters of a 1,3-diaza-2-cycloalken-2-yl-methanol in the presence of an inert solvent, such as an ether, e.g., diethyl ether, p-dioxane, tetrahydrofuran, diethylene-glycol dimethylether and the like, a hydrocarbon, e.g., hexane, cyclohexane, benzene, toluene and the like, an N,N-disubstituted amide, e.g., N,N-dimethylformamide and the like, or a suitable solvent mixture. If necessary, the reaction is carried out while cooling at an elevated temperature, in a closed vessel, and/or, in the atmosphere of an inert gas, e.g., nitrogen.

The starting materials used in the above procedure are known or are prepared according to known methods.

The compounds of this invention are also prepared, for example, by converting in a 9-(reactive functionally converted carboxy-methoxy)-anthracene compound the reactive functionally converted carboxyl group into the 1,3-diaza-3-cycloalken-2-yl group, and, if desired, carrying out the optional steps.

The reactive functionally converted carboxyl group in a 9-(reactive functionally converted carboxy-methoxy)-anthracene starting material is above all a cyano group, as well as an imido-ether, an imido-thioether, an imido-halide, an amidino, an amido, a thioamido, an ester, or an acid halide group.

The conversion of the reactive functionally converted carboxyl group into the desired 1,3-diaza-1-cycloalken-2-yl radical is carried out according to known methods, for example, by reacting the starting material with a lower alkylene diamine, in which the two amino groups are separated by two to four carbon atoms, or with a compound capable of being converted into said lower alkylene diamine compound by treatment with ammonia, or with a reactive N-substituted derivative of said lower alkylene diamine. The desired ring formation is carried out directly or in stages, if necessary, in the presence of a reactant. Furthermore, the process may be performed in such manner that a functional acid derivative is formed in the course of the reaction.

For example, whenever a 9-cyanomethoxy-anthracene compound, representing the preferred starting material, is used and reacted directly with the lower alkylene diamine or with a derivative thereof, it is of advantage to perform the reaction in the presence of hydrogen sulfide, carbon disulfide and the like; in such reaction, the diamine compound may be used in the form of a mono-salt or a poly-salt thereof.

Compounds capable of being converted into a lower alkylene diamine by the reaction with ammonia, are, for example, the corresponding amino-lower alkanols or especilly the esters thereof, as well as lower alkylene dihalides. Using these starting materials, the reaction is carried out in the presence of ammonia or an agent yielding ammonia.

Reactive N-substituted derivatives of lower alkylene-diamines used as the reagents in the process are, for example, ureas, such as ethylene urea, propylene urea and the like.

To carry out the procedure in stages, the 9-(reactive functionally converted carboxy - methoxy) - anthracene starting material is reacted with the lower alkylene diamine to form the N-acyl compound, which is then ring-closed by elimination of water, for example, by using a dehydrating agent, such as calcium oxide and the like, or by desulfurization, for example, with a heavy metal oxide and the like.

The above reaction is carried out according to known methods; conditions depend largely on the choice of the starting material and the reagent. Thus, the reaction may be carried out in the absence or presence of a diluent, catalyst and/or condensing agent, if necessary, while cooling or at an elevated temperature, under increased pressure, and/or in the atmosphere of an inert gas, such as nitrogen. By-products, formed during the reaction, such as water, may be removed, for example, by azeotropic distillation. Furthermore, one of the reactants may be used in excess of the other.

The starting materials used in the above procedure are prepared according to known methods. For example, the previously mentioned metal salt of an anthrone may be treated with a reactive esterified hydroxy-acetic acid or a functional acid derivative thereof; this reaction is carried out in a manner analogous to the one previously-described, involving its treatment with a reactive ester of the 1,3-diaza-2-cycloalken-2-yl-methanol. If desired, a free carboxyl group or a functionally converted carboxyl group, such as, for example, a cyano group, in a resulting intermediate may be converted into the desired reactive functionally converted carboxyl group according to methods known per se.

The 9-(reactive functionally converted carboxy-methoxy)-anthracene starting materials are new and are intended to be included within the scope of the invention. These intermediates are represented by the formula $$An—O—CH_2—R_0$$

in which An has the previously-given meaning, and $R_0$ represents a reactive functionally converted carboxyl group, especially one of the groups of the following formulae

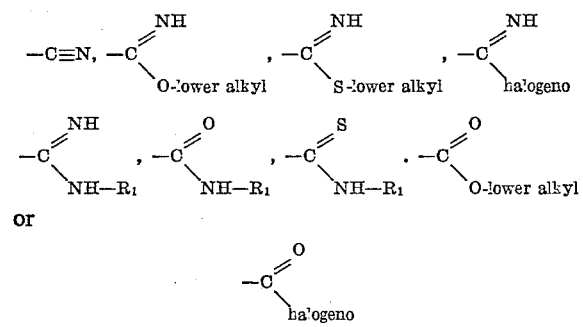

in which halogeno stands primarily for chloro, as well as bromo and the like, and $R_1$ has the above-given meaning, i.e. stands for hydrogen or an aliphatic radical, particularly lower alkyl. A preferred group of compounds is represented by the formula

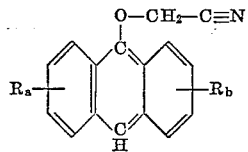

in which $R_a$ and $R_b$ have the previously-given meaning.

In a resulting compound, in which one of the nitrogens of the 1,3-diaza-2-cycloalken-2-yl radical has a hydrogen, such hydrogen may be replaced by an aliphatic group, particularly lower alkyl, according to known methods; for example, a 2-(An-O-methyl)-1,3-diaza-2-cycloalkene, in which the 1,3-diaza-2-cycloalken-2-yl portion is N-unsubstituted, or a salt thereof, such as an alkali metal salt thereof, may be reacted with a reactive ester of an aliphatic alcohol, especially a lower alkanol, for example, an aliphatic halide, such as a lower alkyl halide, e.g. methyl, ethyl, n-propyl or isopropyl chloride, bromide or iodide and the like.

A resulting salt may be converted into the free base, for example, by treatment with an alkaline reagent, such as a metal hydroxide, e.g. sodium hydroxide, potassium hydroxide, calcium hydroxide and the like, a metal carbonate, e.g. sodium, calcium or potassium carbonate or hydrogen carbonate and the like, ammonia or any other alkaline reagent, as well as a suitable hydroxyl ion exchange preparation, etc.

A resulting salt may be converted into another salt, for example, by treatment with an anion exchange preparation. Furthermore, an inorganic acid addition salt may be reacted with a suitable metal, e.g. sodium, barium, silver and the like, salt of an acid, in a diluent, in which a resulting inorganic salt is insoluble and is removed from the reaction, to yield another acid addition salt.

A free compound may be converted into an acid addition salt thereof by reacting it or a solution thereof in a suitable solvent or solvent mixture with an acid, such as one of those described before, or a solution thereof, or with a suitable anion exchange preparation, and isolating the desired salt. A salt may be obtained in the form of a hydrate or may contain solvent of crystallization.

The invention also comprises any modification of the process wherein a compound formed as an intermediate at any stage of the process, is used as starting material and the remaining step(s) of the process is (are) carried out, or the process is discontinued at any stage, or in which the starting materials are formed in the course of the reaction. Also included within the scope of the present invention are any new intermediates, such as, for example, those mentioned hereinbefore.

In the process of this invention, such starting materials are preferably used which lead to final products mentioned before as being preferred embodiments.

The following examples are intended to illustrate the invention and are not to be construed as being limitations thereof. Temperatures are given in degrees centigrade.

EXAMPLE 1

To a mixture of 19.4 g. of anthrone in 194 ml. of N,N-dimethylformamide is added 7.1 g. of a 55 percent suspension of sodium amide in toluene while maintaining an atmosphere of nitrogen. After stirring at room temperature for one hour, a solution of 14.3 g. of 2-chloromethyl-2-imidazoline in 254 ml. of benzene is added, and the reaction mixture is stirred at room temperature for an additional sixteen hours and is then filtered and concentrated. The residue is taken up in water and ethyl acetate and the mixture is heated on the steam bath. The organic layer is separated, treated with a charcoal preparation and filtered. The filtrate containing the 2-(9-anthryloxymethyl)-2-imidazoline of the formula

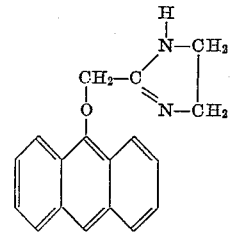

is treated with a solution of hydrogen chloride in ethyl acetate. The resulting 2-(9-anthryloxymethyl)-2-imidazoline hydrochloride is extracted with water, the aqueous phase is filtered and allowed to stand. The resulting crystalline material is filtered off and recrystallized from a mixture of isopropanol and diethyl ether to yield the 2 - (9 - anthryloxymethyl) - 2 - imidazoline hydrochloride, which melts at 222–224°; yield: 2.6 g. An additional 2.4 g. of the salt can be recovered from the aqueous solution.

EXAMPLE 2

The following compounds are prepared according to the previously described procedures by selecting the appropriate starting materials:

2 - (9 - anthryloxymethyl) - 1 - methyl - 2 - imidazoline hydriodide, prepared by reacting 2-(9-anthryloxymethyl)-2-imidazoline with methyl iodide;

2 - (9 - anthryloxymethyl) - 1,4,5,6 - tetrahydro - pyrimidine, prepared by reacting the sodium salt of anthrone with 2-chloromethyl-1,4,5,6-tetrahydro-pyrimidine;

2 - (9 - anthryloxymethyl) - 4 - methyl - 2 - imidazoline, prepared by reacting the sodium salt of anthrone with bromoacetonitrile, and treating the resulting 9-cyanomethoxy-anthracene with 1,2-propylenediamene in the presence of carbon disulfide;

2 - (9 - anthryloxymethyl) - 1,3 - diaza - 2 - cycloheptene, prepared by reacting 9-cyanomethoxy-anthracene with 1,4-butylenediamine in the presence of carbon disulfide;

2 - (2 - methyl - 9 - anthryloxymethyl) - 2 - imidazoline, prepared by reacting the sodium salt of 2-methyl-anthrone with 2-chloromethyl-imidazoline;

2 - (3 - methyl - 9 - anthryloxymethyl) - 2 - imidazoline, prepared by reacting the sodium salt of 3-methyl-anthrone with 2-chloromethyl-imidazoline;

2 - (10 - methyl - 9 - anthryloxymethyl) - 2 - imidazoline, prepared by reacting the sodium salt of 10-methyl-anthrone with 2-chloromethyl-imidazoline;

2 - (1,4 - dimethyl - 9 - anthryloxymethyl) - 2 - imidazoline, prepared by reacting the sodium salt of 1,4-dimethyl-anthrone with 2-chloromethyl-imidazoline;

2 - (2,4 - dimethyl - 9 - anthryloxymethyl) - 2 - imidazoline, prepared by reacting the sodium salt of 2,4-dimethyl-anthrone with 2-chloromethyl-imidazoline;

2 - (4 - fluoro - 9 - anthryloxymethyl) - 2 - imidazoline, prepared by reacting the sodium salt of 4-fluoro-anthrone with 2-chloromethyl-imidazoline;

2 - (1 - chloro - 9 - anthryloxymethyl) - 2 - imidazoline, prepared by reacting the sodium salt of 1-chloro-anthrone with 2-chloromethyl-imidazoline;

2 - (2 - chloro - 9 - anthryloxymethyl) - 2 - imidazoline, prepared by reacting the sodium salt of 2-chloro-anthrone with 2-chloromethyl-imidazoline;

2 - (1 - bromo - 9 - anthryloxymethyl) - 2 - imidazoline, prepared by reacting the sodium salt of 1-bromo-anthrone with 2-chloromethyl-imidazoline;

2 - (1 - methoxy - 9 - anthryloxymethyl) - 2 - imidazoline, prepared by reacting the sodium salt of 1-methoxy-anthrone with 2-chloromethyl-imidazoline;

2 - (2 - methoxy - 9 - anthryloxymethyl) - 2 - imidazoline, prepared by reacting the sodium salt of 2-methoxy-anthrone with 2-chloromethyl-imidazoline, and the like.

What is claimed is:
1. A compound of the formula

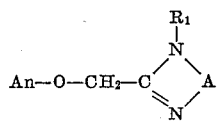

in which An is a member selected from the group consisting of 9-anthryl and 9-anthryl substituted by a member selected from the group consisting of lower alkyl, lower alkoxy, lower alkenyloxy, lower alkylenedioxy, halogeno, lower alkyl mercapto, lower alkanoyl and halogeno-lower alkyl, the group $R_1$ is a member selected from the group consisting of hydrogen, lower alkyl and phenyl-lower alkyl, and A is lower alkylene separating the two nitrogen atoms by two to four carbon atoms.

2. A salt of a compound of the formula

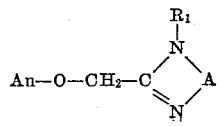

in which An is a member selected from the group consisting of 9-anthryl and 9-anthryl substituted by a member selected from the group consisting of lower alkyl, lower alkoxy, lower alkenyloxy, lower alkylenedioxy, halogeno, lower alkyl mercapto, lower alkanoyl and halogeno-lower alkyl, the group $R_1$ is a member selected from the group consisting of hydrogen, lower alkyl and phenyl-lower alkyl, and A is lower alkylene separating the two nitrogen atoms by two to four carbon atoms.

3. A compound of the formula

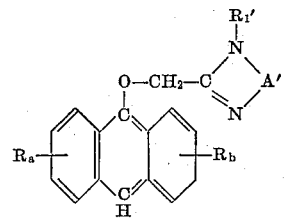

in which each of the groups $R_a$ and $R_b$ is a member selected from the group consisting of hydrogen, lower alkyl, lower alkoxy, halogeno and trifluoromethyl, $A'$ is alkylene having from two to three carbon atoms and separating the two nitrogen atoms by two to three carbon atoms, and $R_1$ is a member selected from the group consisting of hydrogen and lower alkyl.

4. An acid addition salt of a compound of the formula

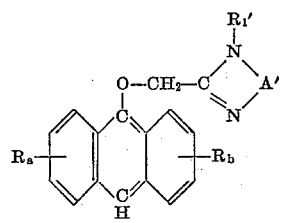

in which each of the groups $R_a$ and $R_b$ is a member selected from the group consisting of hydrogen, lower alkyl, lower alkoxy, halogeno and trifluoromethyl, $A'$ is alkylene having from two to three carbon atoms and separating the two nitrogen atoms by two to three carbon atoms, and $R_1$ is a member selected from the group consisting of hydrogen and lower alkyl.

5. 2-(9-anthryloxymethyl)-2-imidazoline.

6. An acid addition salt of 2-(9-anthryloxymethyl)-2-imidazoline.

7. 2-(9-anthryloxymethyl) - 2 - imidazoline hydrochloride.

References Cited
UNITED STATES PATENTS 2,149,473    3/1939    Sonn _____ 260—309.6

WALTER A. MODANCE, *Primary Examiner.*

N. TROUSOF, *Assistant Examiner.*

UNITED STATES PATENT OFFICE
CERTIFICATE OF CORRECTION

Patent No. 3,340,271　　　　　　　　　　　　　　　September 5, 1967

Lincoln Harvey Werner

It is hereby certified that error appears in the above numbered patent requiring correction and that the said Letters Patent should read as corrected below.

Column 8, lines 11 to 22, the formula should appear as shown below instead of as in the patent:

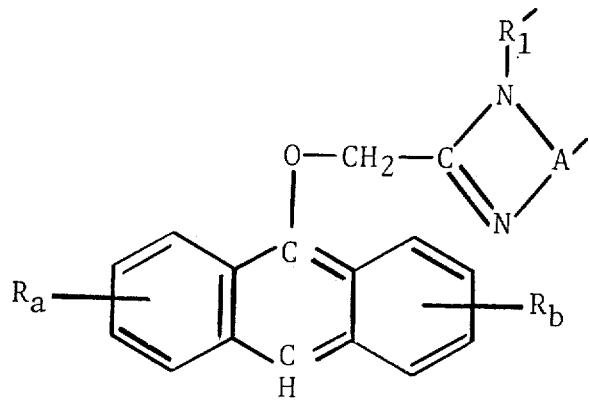

Signed and sealed this 28th day of January 1969.

(SEAL)
Attest:

EDWARD M. FLETCHER, JR.　　　　　　　　　　EDWARD J. BRENNER
Attesting Officer　　　　　　　　　　　　　　Commissioner of Patents